United States Patent [19]

Rosenbaum

[11] Patent Number: 4,527,715
[45] Date of Patent: Jul. 9, 1985

[54] AUTOMATIC VALVE SHUT-OFF SYSTEM
[75] Inventor: Leonard A. Rosenbaum, Old Bethpage, N.Y.
[73] Assignee: CVD Equipment Corp., Deer Park, N.Y.
[21] Appl. No.: 578,085
[22] Filed: Feb. 8, 1984
[51] Int. Cl.³ .............................................. B67D 5/08
[52] U.S. Cl. ........................................ 222/61; 222/55; 222/397; 222/502; 222/505; 251/283
[58] Field of Search ................... 222/39, 55, 61, 502, 222/505; 251/282, 283

[56] References Cited
U.S. PATENT DOCUMENTS 3,082,991 3/1963 Watkins .............................. 251/282
3,499,580 3/1970 Smith .................................. 222/61
3,504,825 4/1970 Diamond et al. ................... 222/61
3,648,893 3/1972 Whiting .............................. 222/397
4,226,343 10/1980 Fling .................................. 222/505

Primary Examiner—Edward G. Favors
Assistant Examiner—Steven E. Warner
Attorney, Agent, or Firm—Leonard Belkin

[57] ABSTRACT

An automatic valve shut-off system useful for gas cylinders and the like employing a pneumatically actuated rotatable shaft to engage the valve handle on the cylinder. A control box is located remotely and conduits carry pressurized gas to energize the pneumatic activator. Solenoid or manual type operated switches select the delivery of pressurized gas to the cylinder and a pneumatic feed back device is provided to indicate the position of the valve handle.

12 Claims, 7 Drawing Figures

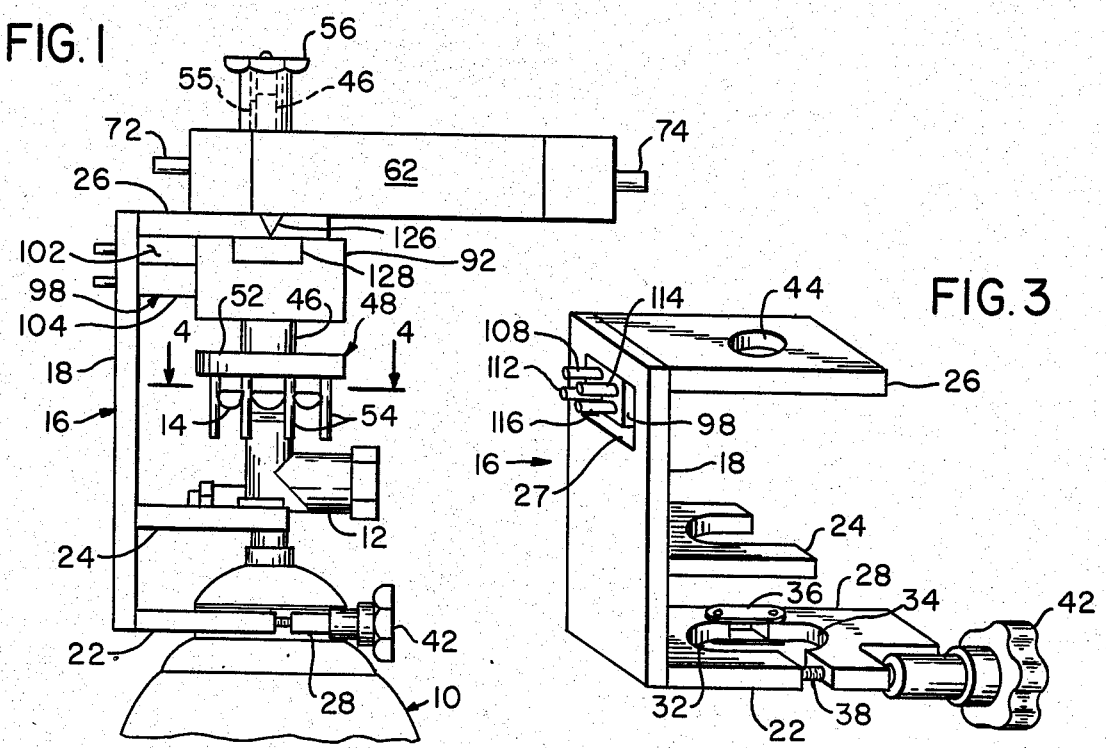
FIG. 1
FIG. 3
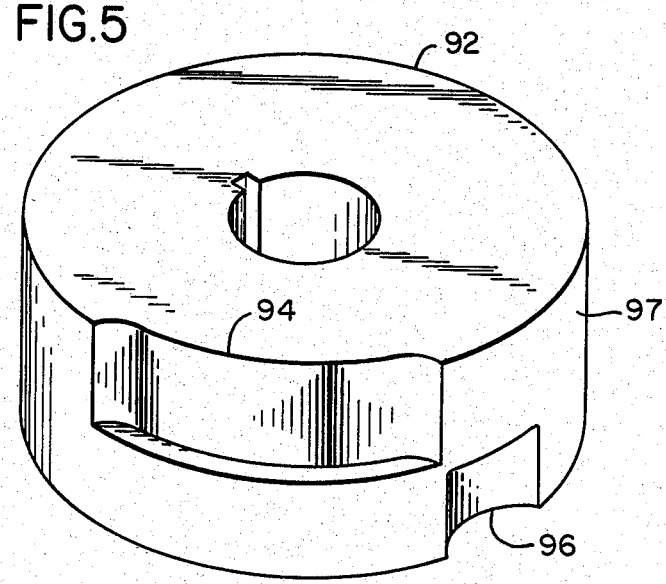
FIG. 5
FIG. 4
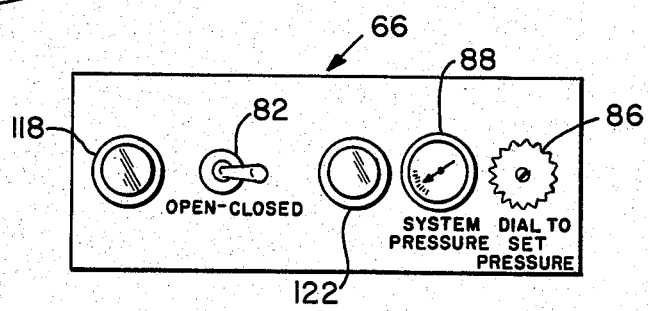
FIG. 6

AUTOMATIC VALVE SHUT-OFF SYSTEM

BACKGROUND OF THE INVENTION

This invention relates to an automatic valve shut-off system useful for gas cylinders and more particularly to a remotely controlled pneumatically activated system for controlling the on/off condition of gas cylinders.

Cylinders for the supply or source of gases under pressure are used extensively in industry. Some of the gases, such as nitrogen, are inert and are relatively harmless. Other gases, on the other hand, are quite hazardous and require the use of safety measures to insure against accidents and unfortunate incidents which could result in damage to facilities and injury to workers.

The types of hazards presented by gases being used in industry are varied. For example, such a gas may be pyrophoric, toxic, explosive, flammable, extremely corrosive, or a combination of any of the foregoing. Thus, the use of protective clothing or helmets by workers when closing off the cylinders during an emergency does not afford the best possible protection, and even routine operations involving the valving of such gases at the cylinders could involve significant risk to workers.

SUMMARY OF THE PRESENT INVENTION

The safety problems mentioned above associated with the control of valving in cylinders containing hazardous gases are reduced substantially in accordance with the principles of this invention by providing a remotely actuated system for opening and closing the valves on said cylinders. The system according to this invention is economic in construction, simple to operate, and has a high degree of reliability. In addition, it avoids the use of electrical contacts adjacent to the cylinder so that there is no restriction in its use when the gas may be flammable or explosive. Furthermore, there is displayed at all times in the operation of this system in an unambiguous fashion the state of the valving for each cylinder being controlled.

In a preferred embodiment of this invention, there is provided a bracket for being removably attached to a gas cylinder with a manually operated valve, a rotatable shaft on the bracket having fingers to engage the valve handle, and a pneumatic cylinder and piston assembly also mounted on the bracket to engage the shaft so that actuation of the piston will rotate the shaft to either open or close the valve. A remotely located control device is provided having a source of compressed gas with a pair of conduits extending to the assembly so that selection of the conduit in which to direct the compressed gas effectively determines whether the valve will be opened or closed.

Other features of the preferred embodiment just described permit adjustment of the force applied to the valve handle, a manual override of the system, remote indicators showing the state of the valve, and automatic close down of the valve under preselected emergency conditions.

It is thus a principal object of this invention to provide a simple yet reliable remotely operated system for shutting down or controlling the valve of a gas cylinder.

Other objects and advantages of this invention will hereinafter become obvious from the following description of preferred embodiments of this invention.

BRIEF DESCRIPTION OF THE DRAWINGS

FIG. 1 is an elevation view of a gas cylinder having mounted thereon a valve control in accordance with the principles of this invention.

FIG. 3 is an isometric view of the bracket employed in the embodiment shown in FIG. 1.

FIG. 4 is a view along 4—4 of FIG. 1.

FIG. 5 is an isometric view of the pneumatic switch operating cam.

FIG. 6 is an elevation view of the front face of the control box.

DESCRIPTION OF THE PREFERRED EMBODIMENTS

Figure 2:
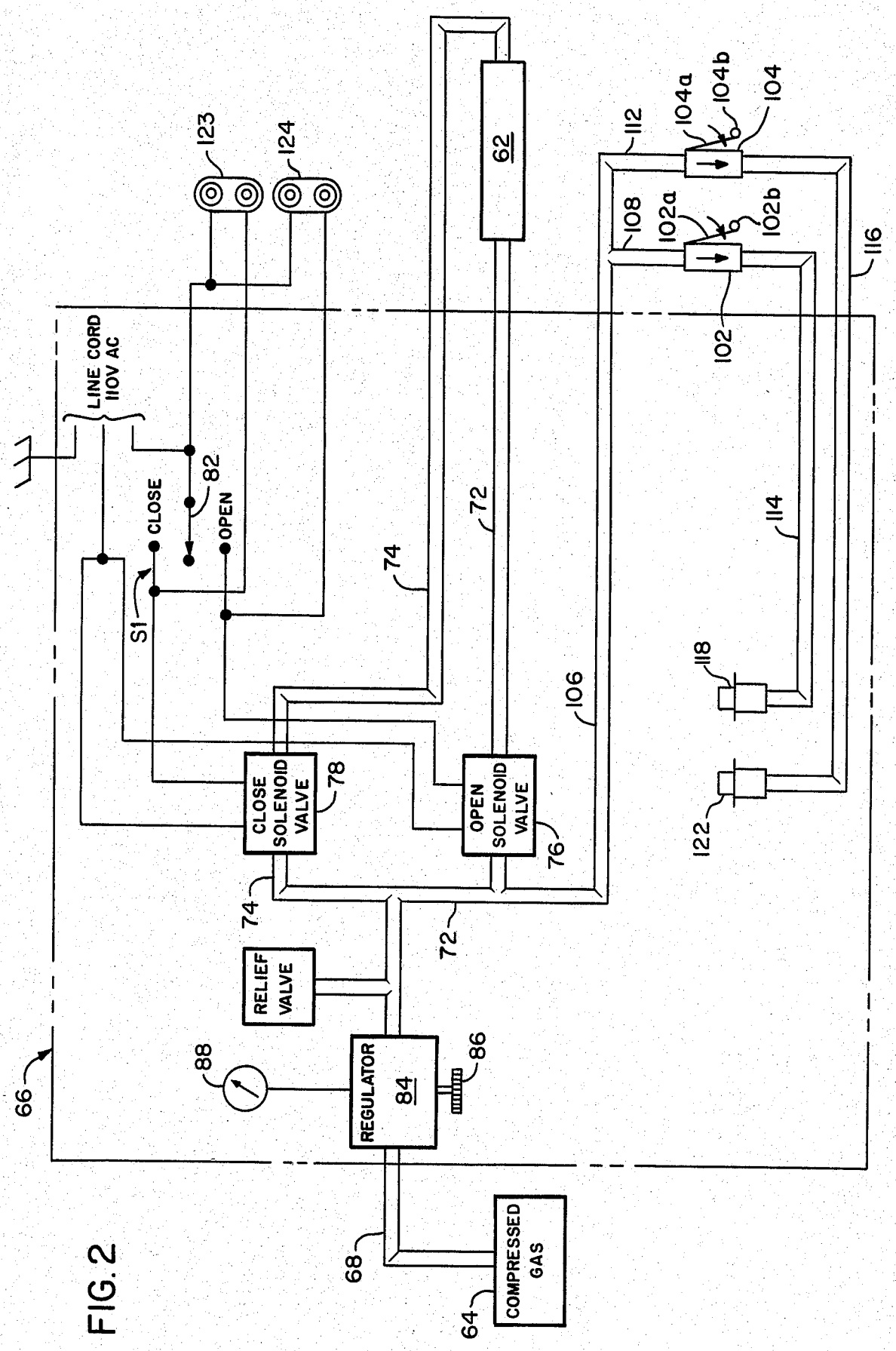
FIG. 2 is a schematized view of a system comprising a preferred embodiment of this invention including the mounting shown in FIG. 1.

Referring to FIG. 1 there is shown the top of a gas cylinder 10 having a conventional valve 12 with a valve handle 14.

In accordance with a preferred embodiment of this invention, mounted on cylinder 10 is a bracket 16 which is also shown in FIG. 3. Bracket 16 consists of a vertical member 18, a lower platform 22, a valve retaining fork 24 which may be made adjustable as to height, and an upper platform 26. Vertical member 18 is provided with an opening 27 for a purpose to be later described.

Lower platform 22 is provided with an adjustable member 28 and a pair of semicircular openings 32 and 34, a hinge 36, and a threaded member 38 attached to a clamp knob 42.

As seen in FIG. 1, bracket 16 is attached to cylinder 10 by placing openings 32 and 34 around a neck of cylinder 10 and tightening knob 42 to clamp bracket 16 in place. The orientation of bracket 16 is such that fork 24 encompasses valve 12 and provides additional support for bracket 16.

Upper platform 26 has an opening 44 to accommodate a rotatable shaft 46 on the bottom of which is mounted a spider 48 which consists of a disc 52 and downwardly extending fingers 54 to engage valve handle 14, as also shown in FIG. 4. The top end of shaft 46 is of reduced diameter and has a key 55 to enter and engage a slip-on handle 56. As will be seen from the discussion below, handle 56 can function as a manual override but can be removed from shaft 46 to prevent tampering of the system. As is understood in the art, shaft 46 may be fabricated in sections to facilitate its mounting on and removal from bracket 16.

Mounted on upper platform 26 is a pneumatic rotational cylinder assembly 62. Such a device is well known in the art and commercially available and consists of a cylinder containing a slidable piston with a chain drive extending externally of the cylinder engaged with teeth mounted on shaft 46 as it passes through assembly 62. When the piston within assembly 62 moves in one direction, shaft 46 will be rotated in one direction. When the piston slides in the opposite direction, then the rotation of shaft 46 will be reversed. Movement of the piston is effected by delivery of pressurized gas to the cylinder within assembly 62 to one side of the piston contained therein as will later be described.

As seen in FIG. 2 showing the complete system, in order to actuate pneumatic rotational cylinder assembly 62, there is provided a source 64 of compressed gas such as air or nitrogen and a control box 66 to effect the control. The face of control box 66 is shown in FIG. 6.

A conduit 68 delivers the pressurized gas to control box 66 where it is then divided into two conduits 72 and 74 for directing the gas to opposite sides of the piston within assembly 62. To make this selection there is a solenoid operated normally closed shut-off valve in each of the two lines, valve 76 in line 72, and valve 78 in line 74. It should be understood that if desired these valves may be made manually operable. To energize solenoid operated valves 76 and 78 there is provided a three-way switch S1 energized by a suitable power source such as line cord voltage. A battery may be employed so that the system will operate when power is interrupted. Switch S1 has a finger operated contact lever 82 which is biased in a neutral position as illustrated. When lever 82 is tipped to close the OPEN contact and energize solenoid operated valve 76, the latter will open delivering pressurized gas to the side of the cylinder within assembly 62 to rotate shaft 46 counter clockwise to open valve 12 on cylinder 10. The action is momentary so that when lever 82 is released and returns to its neutral position, valve 76 is closed due to the deenergization of its solenoid but the piston within assembly 62 will remain at one end of its cylinder.

In order to close valve 12, lever 82 is pressed momentarily against its CLOSE contact, so that valve 78 is opened due to energization of its solenoid, sending compressed gas into line 74 to the other side of cylinder 35 assembly 62 and driving the piston therein to the opposite end of its cylinder, rotating shaft 46 clockwise and closing valve 12.

It will be noted that gas conduit 68 is provided with a pressure regulator 84 with a hand operated dial 86 and a pressure gauge 88. This arrangement makes it possible to adjust the force delivered to shaft 46 to that necessary to operate handle 14. The force required in particular circumstances can of course vary over a significant range.

As control box 66 is likely to be located where it may not be convenient or possible to ascertain the position of valve handle 14 on gas cylinder 10, there is provision to indicate the valve position on control box 66.

Referring to FIG. 1, mounted on shaft 46 is a cylindrical cam 92, also shown in FIG. 5, having a pair of depressed surfaces 94 and 96 extending for short distances along the outer surface 97 of the cam. In effect surfaces 94 and 96 are along two side by side tracks on the outer surface of cams 92.

Through opening 27 in bracket 16 is mounted a switch assembly 98 consisting of two pneumatic switches 102 and 104 riding on the outer surface of cam 92. Each of switch 102 and 104 is of conventional design with a roller tipped arm biased into making contact with cam 92. With the arms compressed by outer surface 97 of cam 92, the pneumatic switches 102 and 104 are closed. As cam 92 rotates reflecting rotation of shaft 46 and valve handle 14, depressed surface 94 will come opposite switch 102 causing its arm to extend thereby opening and permitting gas flow therethrough. Depressed surface 96 has a similar effect on pneumatic switch 104.

Referring back to FIG. 2, it will be seen that a conduit 106 extends from conduit 72 carrying compressed gas to pneumatic switches 102 and 104 through branches 108 and 112. The switches are provided with arms and rollers 102a, 102b, and 104a and 104b, respectively. From the switches, branches 114 and 116 carry the gas under pressure to pneumatic indicators 118 and 122, respectively, on the face of control box 66. As is understood in the art, indicators 118 and 122 are color coded to indicate exposure or lack of exposure to compressed gas, thereby showing which pneumatic switch is open and hence the position of shaft 46 and valve handle 14. Switch 102 may represent the open position of valve 12, while in one full clockwise rotation, switch 104 would indicate the closed position of valve 12.

Jacks 123 and 124 are provided on control box 66 to permit an external safety or alarm system to be plugged in to bypass switch S1 and actuate solenoid valves 76 and 78 automatically in accordance with a programmed response to preselected conditions monitored by the external safety or alarm system (not shown) not forming a part of this invention.

In the operation of the apparatus described, bracket 16 is mounted on the particular cylinder 10 to be controlled and control box 66 located at a remote location considered to be secure. Source 64 of compressed gas could be located anywhere which is convenient and presumably this would be near box 66. All conduits would be made of flexible hose, and it has been found that relatively small diameters of the order of ½ inch are suitable. Power requirements for control box 66 are low because solenoids 76 and 78 are not normally energized. With valve handle 14 in its closed position, shaft 46 must be positioned with the piston in assembly 62 at its end position corresponding to the cylinder closed position and then spider 48 dropped down over handle 14. Indicia may be utilized to facilitate the initial assembly. For example, a color coded arrow 126 on one side of upper platform 26 would be lined up with a color coded band 128 on cam 92 for this purpose. On the other side, different colors may be employed. Pressure regulator 84 is adjusted to insure that there is sufficient gas pressure to rotate handle 14.

In the arrangement just described, control can be exercised manually, that is, an operator moves switch lever 82 to change the position of valve handle 14. It is understood, however, that it may be desirable to interface control box 66 to an existing alarm or safety system for automatic closure of valve 12. Jacks 122 and 124 previously described may be employed for this purpose. For example, solenoid 78 may be energized automatically when an emergency condition is detected, such as by a fire detector or a gas detector. In such an arrangement, this system can function as part of a larger safety system to close cylinder 10 when control box 66 is left unattended.

The control system described can be overridden by rotating handle 56 to either open or close valve 12. Handle 56 can be removed also, if desired to prevent tampering of the condition of valve 12 by those not authorized to exercise such control.

Figure 7:
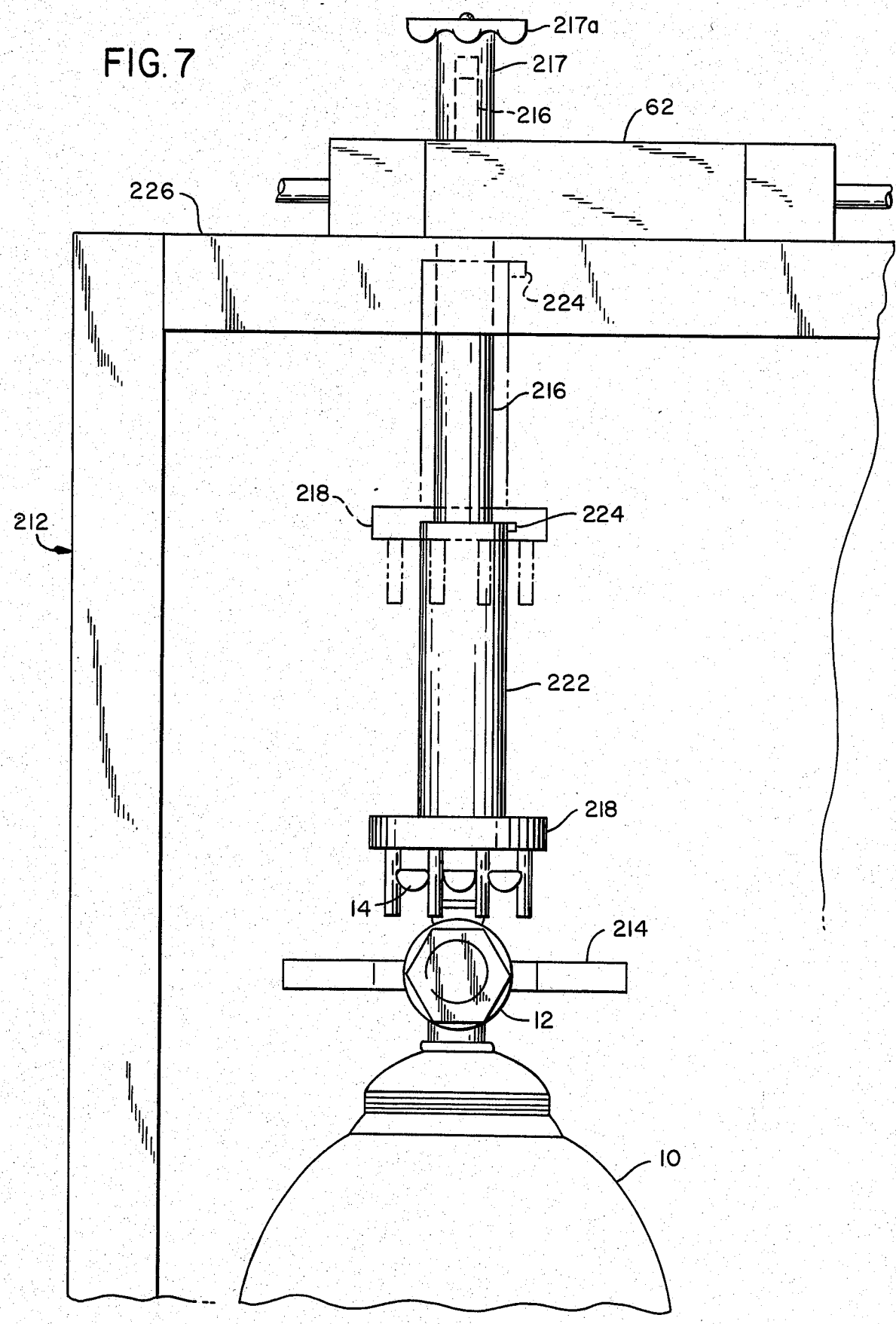
FIG. 7 is an elevation view of another embodiment of the mounting arrangement.

In order to facilitate the connection of this control system to one or more gas cylinders, an alternative arrangement may be provided in which the use of the bracket can be avoided. In this arrangement, as illustrated in FIG. 7, there is a cabinet 212 (with the door removed) which can accommodate more than one gas cylinder. Cylinder 10 is placed in cabinet 212 and a valve retaining fork 214 mounted on and extending from the back wall engages valve 12. This insures proper alignment of cylinder 10 and also prevents its rotation when valve handle 14 is rotated. A strap (not shown) may also be employed to secure cylinder 10 within cabinet 212.

Pneumatic rotational cylinder assembly 62 is located on the top of cabinet 212 engaged with rotatable shaft 216 which extends down into the former. A removable sleeve 217 with a handle 217a is provided for the manual operation of the valve as previously described. Spider 218 is located on the bottom of a member 222 which slides over shaft 216. Member 222 is hollow and contains a spring (not shown) to bias the former into its downward position to insure that spider 218 does not accidently become disengaged from valve handle 14. A key 224 on member 222 permits the latter to be raised and twist locked into its upper position (shown in phantom) when cylinder 10 is being replaced. A suitable keyway and slot in the top 226 would be provided for engagement with key 224.

Cabinet 212 may be designed to house and exercise control over several gas cylinders and may be provided with a door to fully enclose the cylinders. Replacement of cylinders in this configuration is relatively simple and fast and enhances the usefulness of the control system comprising this invention. The pneumatic switches and cam (not shown) for indicating the position of valve handle 14 would be located in cabinet 212 under top 226.

While only certain preferred embodiments of this invention have been described, it is understood that many variations are possible without departing from the principles of this invention as defined in the claims which follow.

What is claimed is:

1. Apparatus for the remote actuation of a valve with a manually operable valve handle on a gas cylinder comprising:
   a. shaft means for engaging said valve handle and selectively moving said valve between its closed position and its open position;
   b. pneumatic means connected to said shaft means for actuating the latter;
   c. means for being removably connected to said cylinder to support said shaft means and said pneumatic means;
   d. means located remotely from said cylinder for controlling operation of said pneumatic means;
   e. a source of compressed gas; and
   f. initiation means included in said controlling means for selectively directing flow of said compressed gas under pressure to said pneumatic means for rotating said shaft means in the direction of closing said valve or rotating said shaft means in the direction of opening said valve.

2. The apparatus of claim 1 in which said shaft means includes extended fingers for interlocking with said valve handle.

3. The apparatus of claim 2 having means to adjust the pressure of said compressed gas delivered to said pneumatic means thereby adjusting the force applied to said valve handle.

4. The apparatus of claim 3 having pneumatically actuated means for indicating on said controlling means whether said valve is open or closed.

5. The apparatus of claim 4 in which said indicating means includes cam means on said shaft means and pneumatic switch means actuated by said cam means for directing said compressed gas to produce the correct indication.

6. The apparatus of claim 5 including means responsive to the occurrence of a preselected condition for actuating said initiating means to close said valve.

7. The apparatus of claim 5 in which said means removably connected to said cylinder is a bracket clamped to said cylinder.

8. The apparatus of claim 7 having first conduit means for delivering said gas under pressure to said controlling means, and second and third conduit means for delivering said gas under pressure from said controlling means to said pneumatic means, said initiation means having solenoid actuated valve means in said second and third conduit means to direct gas flow to within said pneumatic means for establishing the direction of rotation of said valve.

9. The apparatus of claim 1 in which said means removably connected to said cylinder is a cabinet to contain said cylinder, and means attached to and within said cabinet for engaging the valve on said cylinder for supporting and aligning the latter, said shaft means and pneumatic means being supported by said cabinet.

10. The apparatus of claim 9 having means to retract said shaft means to permit convenient removal and replacement of said cylinder.

11. The apparatus of claim 1 having removable manual override means on said shaft means.

12. The apparatus of claim 9 having removable manual override means on said shaft means.

* * * * *